(12) United States Patent
Meyerhofer et al.

(10) Patent No.: US 9,125,010 B2
(45) Date of Patent: Sep. 1, 2015

(54) SYSTEMS AND METHODS TO IMPLEMENT DEMAND RESPONSE EVENTS

(75) Inventors: Mark Joseph Meyerhofer, Acworth, GA (US); James Joseph Schmid, Acworth, GA (US); Jerry Steven Massey, Lawrenceville, GA (US); Jaime Alberto Sierra, Atlanta, GA (US)

(73) Assignee: General Electric Company, Schenectady, NY (US)

(*) Notice: Subject to any disclaimer, the term of this patent is extended or adjusted under 35 U.S.C. 154(b) by 518 days.

(21) Appl. No.: 13/283,299

(22) Filed: Oct. 27, 2011

(65) Prior Publication Data

US 2013/0109410 A1    May 2, 2013

(51) Int. Cl.
*G05D 3/12* (2006.01)
*H04W 4/02* (2009.01)
*H04L 29/08* (2006.01)

(52) U.S. Cl.
CPC ........... *H04W 4/02* (2013.01); *H04L 67/14* (2013.01); *H04L 67/22* (2013.01); *H04L 67/306* (2013.01)

(58) Field of Classification Search
CPC ...................................................... H04W 4/02
USPC ....................................................... 700/295
See application file for complete search history.

(56) References Cited

U.S. PATENT DOCUMENTS

| | | | | |
|---|---|---|---|---|
| 3,678,284 A | * | 7/1972 | Peters | 290/1 R |
| 3,872,286 A | * | 3/1975 | Putman | 705/412 |
| 3,906,242 A | * | 9/1975 | Stevenson | 307/38 |
| 3,925,680 A | | 12/1975 | Dixon | |
| 3,995,686 A | | 12/1976 | Laube | |
| 4,031,406 A | * | 6/1977 | Leyde et al. | 307/41 |
| 4,059,747 A | | 11/1977 | Brody | |
| 4,100,426 A | * | 7/1978 | Baranowski et al. | 307/41 |
| 4,117,537 A | | 9/1978 | Muench | |
| 4,125,782 A | | 11/1978 | Pollnow, Jr. | |
| 4,181,950 A | * | 1/1980 | Carter, II | 700/291 |
| 4,197,468 A | | 4/1980 | Reid, Jr. | |
| 4,310,770 A | | 1/1982 | Keener et al. | |
| 4,382,284 A | * | 5/1983 | Dressel et al. | 700/295 |
| 4,804,938 A | * | 2/1989 | Rouse et al. | 370/276 |
| 4,847,781 A | | 7/1989 | Brown, III et al. | |
| 5,311,562 A | * | 5/1994 | Palusamy et al. | 376/215 |
| 5,381,462 A | | 1/1995 | Larson et al. | |
| 5,483,468 A | * | 1/1996 | Chen et al. | 702/186 |
| 5,687,139 A | * | 11/1997 | Budney | 368/10 |

(Continued)

OTHER PUBLICATIONS

Tsikalakis et al., "Centralized Control for Optimizing Microgrids Operation", IEEE, Jul. 24-29, 2011, pp. 1-8.*

(Continued)

*Primary Examiner* — Robert Fennema
*Assistant Examiner* — Thomas Stevens
(74) *Attorney, Agent, or Firm* — Armstrong Teasdale LLP (57) ABSTRACT

A computing device for use with a demand response system is provided. The computing device includes an interface for receiving customer data that includes at least a location for each customer and/or a preference selection made by each customer associated with at least one demand response program. A processor coupled to the interface and programmed to select a plurality of participants from the customer data to receive a plurality of signals representative of at least one demand response event. The processor selects the participants based at least in part on the customer location and/or the preference selection associated with each customer.

17 Claims, 3 Drawing Sheets

(56) References Cited

U.S. PATENT DOCUMENTS

| | | | |
|---|---|---|---|
| 6,018,690 A | 1/2000 | Saito et al. | |
| 6,054,984 A * | 4/2000 | Alexander | 715/771 |
| 6,064,420 A | 5/2000 | Harrison et al. | |
| 6,078,785 A * | 6/2000 | Bush | 455/7 |
| 6,098,050 A * | 8/2000 | Knoblock et al. | 705/28 |
| 6,138,461 A | 10/2000 | Park et al. | |
| 6,380,947 B1 * | 4/2002 | Stead | 345/645 |
| 6,528,957 B1 * | 3/2003 | Luchaco | 315/307 |
| 6,570,592 B1 * | 5/2003 | Sajdak et al. | 715/769 |
| 6,697,951 B1 * | 2/2004 | Sinha et al. | 713/300 |
| 6,810,516 B2 * | 10/2004 | Lauris | 717/105 |
| 6,900,738 B2 | 5/2005 | Crichlow | |
| 6,909,942 B2 | 6/2005 | Andarawis et al. | |
| 7,019,496 B1 | 3/2006 | Garretson | |
| 7,039,532 B2 | 5/2006 | Hunter | |
| 7,123,994 B2 | 10/2006 | Weik et al. | |
| 7,181,320 B2 | 2/2007 | Whiffen et al. | |
| 7,206,670 B2 | 4/2007 | Pimputkar et al. | |
| 7,274,305 B1 | 9/2007 | Luttrell | |
| 7,310,620 B2 | 12/2007 | Moore et al. | |
| 7,333,982 B2 | 2/2008 | Bakalash et al. | |
| 7,373,221 B2 | 5/2008 | Lal | |
| 7,373,222 B1 | 5/2008 | Wright et al. | |
| 7,392,115 B2 | 6/2008 | Schindler | |
| 7,469,190 B2 * | 12/2008 | Bickel | 702/60 |
| 7,561,681 B2 | 7/2009 | Booth et al. | |
| 7,565,227 B2 | 7/2009 | Richard et al. | |
| 7,653,443 B2 | 1/2010 | Flohr | |
| 7,660,649 B1 | 2/2010 | Hope et al. | |
| 7,715,951 B2 | 5/2010 | Forbes, Jr. et al. | |
| 7,743,001 B1 | 6/2010 | Vermeulen et al. | |
| 7,778,738 B2 | 8/2010 | Taft | |
| 7,885,917 B2 | 2/2011 | Kuhns et al. | |
| 7,945,466 B2 | 5/2011 | Klett et al. | |
| 7,962,248 B2 | 6/2011 | Flohr | |
| 8,219,258 B1 * | 7/2012 | Almeida et al. | 700/291 |
| 8,872,379 B2 * | 10/2014 | Ruiz et al. | 307/66 |
| 8,972,467 B2 * | 3/2015 | Heinrich et al. | 707/826 |
| 2001/0010032 A1 * | 7/2001 | Ehlers et al. | 702/62 |
| 2001/0014976 A1 | 8/2001 | Roop et al. | |
| 2001/0034236 A1 | 10/2001 | Tong et al. | |
| 2002/0002509 A1 | 1/2002 | Wagorn et al. | |
| 2002/0072868 A1 * | 6/2002 | Bartone et al. | 702/62 |
| 2003/0125843 A1 * | 7/2003 | Prasad | 700/291 |
| 2003/0167178 A1 | 9/2003 | Jarman et al. | |
| 2004/0075343 A1 * | 4/2004 | Wareham et al. | 307/39 |
| 2004/0088083 A1 | 5/2004 | Davis et al. | |
| 2004/0107259 A1 | 6/2004 | Wallace et al. | |
| 2005/0154499 A1 * | 7/2005 | Aldridge et al. | 700/286 |
| 2005/0165511 A1 * | 7/2005 | Fairlie | 700/286 |
| 2005/0240668 A1 | 10/2005 | Rolia et al. | |
| 2006/0042846 A1 * | 3/2006 | Kojori et al. | 180/65.8 |
| 2006/0125422 A1 * | 6/2006 | Costa | 315/294 |
| 2006/0143483 A1 | 6/2006 | Liebenow | |
| 2007/0177319 A1 * | 8/2007 | Hirst | 361/85 |
| 2007/0260359 A1 * | 11/2007 | Benson et al. | 700/297 |
| 2008/0167756 A1 * | 7/2008 | Golden et al. | 700/297 |
| 2008/0177678 A1 | 7/2008 | Di Martini et al. | |
| 2009/0018706 A1 * | 1/2009 | Wittner | 700/295 |
| 2009/0187499 A1 | 7/2009 | Mulder et al. | |
| 2009/0194601 A1 * | 8/2009 | Flohr | 236/51 |
| 2009/0228324 A1 * | 9/2009 | Ambrosio et al. | 705/10 |
| 2009/0240964 A1 | 9/2009 | Pfeiffer | |
| 2009/0256686 A1 * | 10/2009 | Abbot et al. | 340/310.11 |
| 2009/0295594 A1 | 12/2009 | Yoon | |
| 2009/0326726 A1 * | 12/2009 | Ippolito et al. | 700/291 |
| 2010/0017045 A1 * | 1/2010 | Nesler et al. | 700/296 |
| 2010/0088261 A1 * | 4/2010 | Montalvo | 706/15 |
| 2010/0107173 A1 * | 4/2010 | Chassin | 718/104 |
| 2010/0138065 A1 | 6/2010 | Taft | |
| 2010/0138275 A1 * | 6/2010 | Bateni et al. | 705/10 |
| 2010/0145540 A1 * | 6/2010 | McKenna | 700/295 |
| 2010/0179704 A1 | 7/2010 | Ozog | |
| 2010/0179862 A1 | 7/2010 | Chassin et al. | |
| 2010/0217550 A1 | 8/2010 | Crabtree et al. | |
| 2010/0286937 A1 * | 11/2010 | Hedley et al. | 702/60 |
| 2010/0332373 A1 * | 12/2010 | Crabtree et al. | 705/37 |
| 2011/0125542 A1 * | 5/2011 | Koch | 705/7.16 |
| 2011/0138198 A1 * | 6/2011 | Boss et al. | 713/310 |
| 2011/0153106 A1 * | 6/2011 | Drake et al. | 700/295 |
| 2011/0196546 A1 | 8/2011 | Muller et al. | |
| 2011/0202217 A1 | 8/2011 | Kempton | |
| 2011/0258018 A1 | 10/2011 | Tyagi et al. | |
| 2012/0004786 A1 | 1/2012 | Lo et al. | |
| 2012/0022709 A1 * | 1/2012 | Taylor | 700/295 |
| 2012/0116600 A1 | 5/2012 | Schmid et al. | |
| 2012/0130556 A1 * | 5/2012 | Marhoefer | 700/291 |
| 2012/0136496 A1 | 5/2012 | Black et al. | |
| 2012/0310860 A1 | 12/2012 | Kim et al. | |
| 2012/0316688 A1 * | 12/2012 | Boardman et al. | 700/291 |
| 2012/0323393 A1 | 12/2012 | Imhof et al. | |
| 2013/0035883 A1 | 2/2013 | San Andres et al. | |
| 2013/0254151 A1 | 9/2013 | Mohagheghi et al. | |
| 2014/0062195 A1 | 3/2014 | Bruschi et al. | |

OTHER PUBLICATIONS

Kok et al., "PowerMatcher: Multiagent Control in the Electricity Infrastructure", IEEE, 2005, pp. 75-82.*

Ilic, M.D., "From Hierarchical to Open Access Electric Power Systems", IEEE, 2007, pp. 1060-1084.*

* cited by examiner

SYSTEMS AND METHODS TO IMPLEMENT DEMAND RESPONSE EVENTS

BACKGROUND OF THE INVENTION

The field of the invention relates generally to demand response systems and, more particularly, to a computing device for use with a demand response system that enables utilities to selectively provide signals related to demand response events to its customers.

As the human population increases around the world and with an increase in the use of electric vehicles by customers, energy demand will also likely increase. More specifically, energy demand will likely increase in the form of electrical energy used to power buildings, homes, and/or to charge batteries or other energy sources used in electric vehicles. Moreover, the demand on the power grid is likely to increase while the demand for fuel decreases. Such demands will likely cause an increase in the price of energy from the power grid. In particular, the price of energy is likely to increase during peak times, such as a time of day and/or a day of the week, when demand for energy is high.

Currently, at least some known utilities use demand response systems that enable customers to enroll in at least one demand response program to manage the consumption of energy by their customers in response to supply conditions. Examples of demand response programs include a direct control program, a critical peak pricing program, and a time of use program. The initiation and/or implementation of a demand response program by a utility is known as a demand response event. A demand response event is initiated by a utility transmitting a plurality of signals to its customers. For example, a demand response event representative of a direct load control program, is initiated when the utility transmits a signal to a device within a building, such as an in-home smart device and/or smart thermostat, such that the utility is enabled to directly control the usage of energy consuming machines within the building. A demand response event representative of a critical peak pricing program occurs when the utility transmits pricing signals to its customers during peak demand times. The pricing signals enable the utility to apprise customers of heightened energy prices during peak demand time periods such that customers may limit their energy consumption during such peak demand time periods. A demand response event representative of a time of use program occurs when the utility transmits a signal to a customer that is representative of energy prices that correspond to a time range such that the customer may identify an optimal time of day and/or day of the week to consume energy to ensure a low energy price rate.

Such demand response systems enable the utility to manage peak load conditions and to reduce energy demand among its customers. However, current demand response systems are unable to target specific customers and/or locations on their grid to reduce the chances of a failure of the grid. Moreover, current demand response systems are unable to prevent an overuse of a certain demand response program by customers. Current demand response systems also transmit signals to all the customers and the signals are transmitted at the same time to all the customers, resulting in various problems, such as an increase in load leveling.

BRIEF DESCRIPTION OF THE INVENTION

In one embodiment, a computing device for use with a demand response system is provided. The computing device includes an interface for receiving customer data that includes at least a location for each customer and/or a preference selection made by each customer associated with at least one demand response program. A processor coupled to the interface and programmed to select a plurality of participants from the customer data to receive a plurality of signals representative of at least one demand response event. The processor selects the participants based at least in part on the customer location and/or the preference selection associated with each customer.

In another embodiment, a demand response system is provided. The demand response system includes a computing device and at least one user notification device coupled to the computing device. The computing device includes an interface for receiving customer data that includes at least a location for each customer and/or a preference selection made by each customer associated with at least one demand response program. A processor coupled to the interface and programmed to select a plurality of participants from the customer data to receive a plurality of signals representative of at least one demand response event. The processor selects the participants based at least in part on the customer location and/or the preference selection associated with each customer. The user notification device is configured to receive at least one of the plurality of signals.

In yet another embodiment, a method for implementing demand response events is provided. Customer data that includes at least a location for each customer and/or a preference selection made by each customer associated with at least one demand response program is received. A plurality of participants are selected from the customer data to receive a plurality of signals that are representative of at least one demand response event based at least in part on the customer location and/or the preference selection associated with each customer.

DETAILED DESCRIPTION OF THE INVENTION

The exemplary systems and methods described herein overcome at least some known disadvantages of known demand response systems by enabling a utility to selectively transmit signals representative of demand response programs to customers based on the location of the customer and/or a specific type of demand response program that has been selected by each customer to participate in. More specifically, the embodiments described herein provide a computing device for use with a demand response system. The computing device includes an interface for receiving customer data that includes at least a location for each customer and/or a preference selection made by each customer associated with at least one demand response program. A processor coupled to the interface and programmed to select a plurality of participants from the customer data to receive a plurality of signals representative of at least one demand response event. The processor selects the participants based at least in part on the customer location and/or the preference selection associated with each customer, types of demand response event signals being sent, hierarchy of the demand response event signals, geographical location of the selected participants and specific assets which the utility may want to target. Accordingly, the utility is able to target specific customers and/or locations on their grid to provide more reliable and substantially greater load reduction. Moreover, by selectively transmitting signals to only selected participants, an overuse of a certain demand response program is prevented and the burden on every customer may be substantially reduced.

Figure 1:
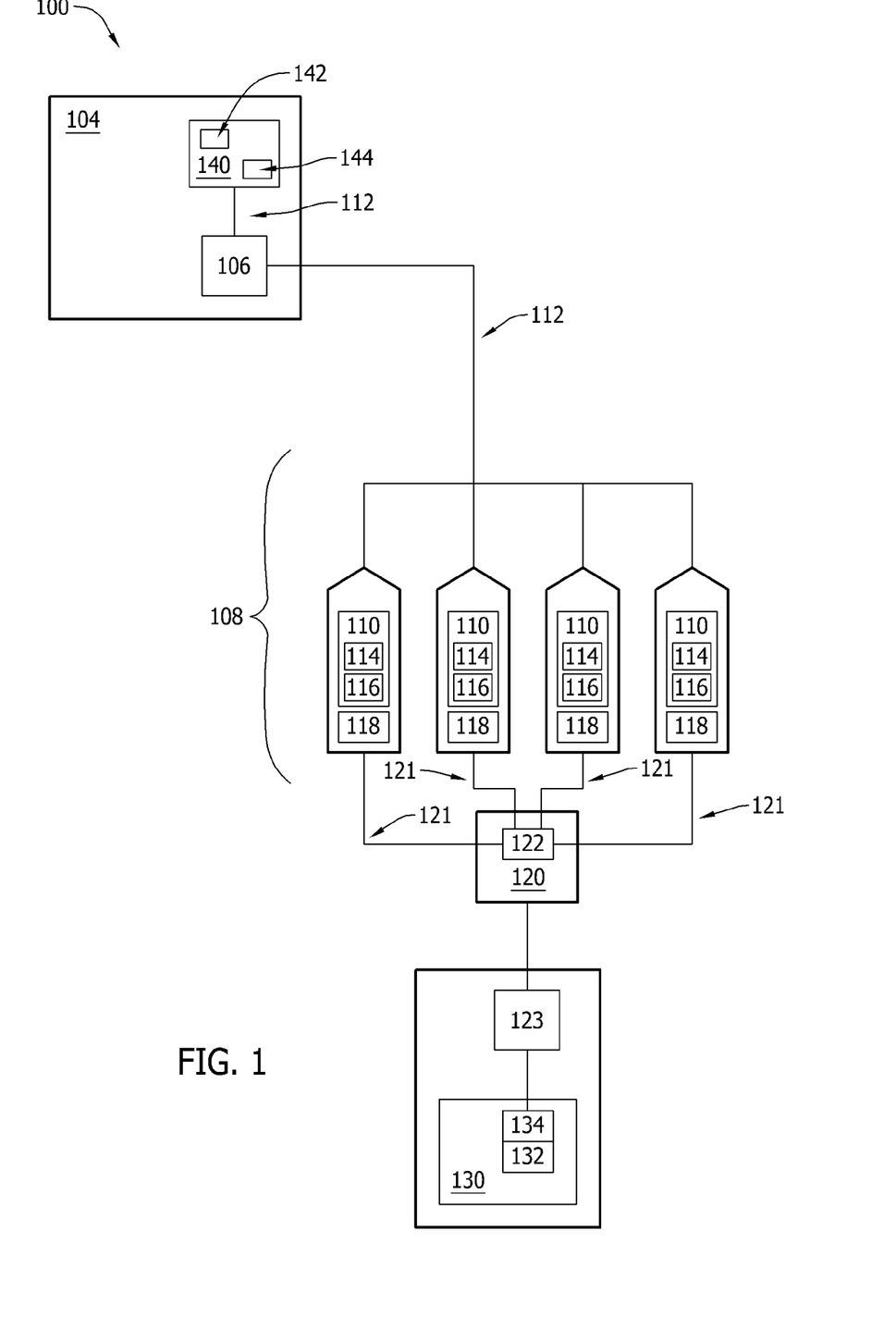
FIG. 1 is a block diagram of an exemplary demand response system.

FIG. 1 illustrates a demand response system 100. In the exemplary embodiment, demand response system 100 includes a utility 104 and a computing device 106 positioned within utility 104, wherein computing device 106 enables utility 104 to communicate with customers. Alternatively, computing device 106 may be positioned at another location with respect to utility 104. Moreover, in the exemplary embodiment, computing device 106 is communicatively coupled to a plurality of buildings 108, wherein a plurality of customers may reside. It should be noted that, as used herein, the term "couple" is not limited to a direct mechanical, electrical, and/or communication connection between components, but may also include an indirect mechanical, electrical, and/or communication connection between multiple components.

More specifically, in the exemplary embodiment, computing device 106 is communicatively coupled to at least one user notification device 110 within each building 108 via a network 112 such that computing device 106 may communicate with user notification device 110. In the exemplary embodiment, user notification device 110 may be a computer, a cellular phone, and/or a smart device, including a smart box and/or smart thermostat. Alternatively, user notification device 110 may be any other device that is configured to communicate with computing device 106. In the exemplary embodiment, each user notification device 110 is connected to network 112 and thus, each customer of utility 104 who is the owner and/or user of user notification device 110, has the same network location. Alternatively, each user notification device 110 may be connected to different networks.

Moreover, in the exemplary embodiment, each user notification device 110 includes a user interface 114 that receives at least one input from a user, such as a customer of utility 104. In the exemplary embodiment, user interface 114 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone) that enables the user to input pertinent information.

Moreover, in the exemplary embodiment, each user notification device 110 includes a presentation interface 116 that presents information, such as information regarding demand response events that are received from utility 104, input events and/or validation results, to the user. In the exemplary embodiment, presentation interface 116 includes a display adapter (not shown) that is coupled to at least one display device (not shown). More specifically, in the exemplary embodiment, the display device is a visual display device, such as a cathode ray tube (CRT), a liquid crystal display (LCD), an organic LED (OLED) display, and/or an "electronic ink" display. Alternatively, presentation interface 116 may include an audio output device (e.g., an audio adapter and/or a speaker) and/or a printer.

In the exemplary embodiment, computing device 106 may communicate with each user notification device 110 using a wired network connection (e.g., Ethernet or an optical fiber), a wireless communication means, such as radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, a cellular phone technology (e.g., the Global Standard for Mobile communication (GSM)), a satellite communication link, and/or any other suitable communication means. WIMAX is a registered trademark of WiMax Forum, of Beaverton, Oreg. IEEE is a registered trademark of the Institute of Electrical and Electronics Engineers, Inc., of New York, N.Y. More specifically, in the exemplary embodiment, user notification device 110 is configured to receive at least one signal from computing device 106 that is representative of at least one demand response event. In the exemplary embodiment, the demand response event includes an implementation of at least one demand response program that includes a direct load control program, a peak pricing program, such as a critical peak pricing program, a rebate-based program, and/or a time of use program.

In the exemplary embodiment, each building 108 also includes at least one machine 118. Each machine 118, in the exemplary embodiment, consumes energy, such as an appliance and/or a computer. User notification device 110 may or may not be coupled to machine 118. For example, if user notification device 110 is a smart device, then user notification device 110 may be coupled to machine 118, such as an appliance. Moreover, in the exemplary embodiment, each building 108 is coupled to utility asset, such as a power distribution substation 120 via a plurality of conduits 121. In the exemplary embodiment, conduits 121 are fabricated from a metallic wire. Alternatively, conduits 121 may be fabricated from any other substance or compound that enables the distribution of electrical energy to each building 108.

More specifically, in the exemplary embodiment, substation 120 includes a grid 122 that is coupled to each building 108 and provides power to each building 108. In the exemplary embodiment, grid 122 is coupled to a generator 123 within a power generation system 124 that is operated by utility 104. In the exemplary embodiment, power generation system 124 includes a machine 130. Machine 130, in the exemplary embodiment, is a variable speed machine, such as a wind turbine, a hydroelectric steam turbine, a gas turbine, and/or any other machine that operates with a variable speed. Alternatively, machine 130 may be a synchronous speed machine. In the exemplary embodiment, machine 130 includes a rotating device 132, such as a rotor or other device. Moreover, in the exemplary embodiment, rotating device 132 rotates a drive shaft 134 that is coupled to generator 123.

In the exemplary embodiment, utility 104 also includes a data management system 140 that is coupled to computing device 106 via network 112. Alternatively, data management system 140 may be separate from utility 104. Data management system 140 may be any device capable of accessing network 112 including, without limitation, a desktop computer, a laptop computer, or other web-based connectable equipment. More specifically, in the exemplary embodiment, data management system 140 includes a database 142 that includes customer data for each of the customers of utility 104. In the exemplary embodiment, database 142 can be fully or partially implemented in a cloud computing environment such that data from the database is received from one or more computers (not shown) within utility 104 or remote from utility 104. The customer data includes information, such as a location for each customer and a selection made by each customer for at least one demand response program to participate in. In the exemplary embodiment, the location for each customer includes a geographic location for each customer, a location on network 112 for each customer, and a location for substation 120 for each customer. The customer data may also include at least one demand response program selected by each customer for each machine 118. Moreover, in the exemplary embodiment, data management system 140 includes a user interface 144 that receives at least one input from a user, such as an operator and/or employee of utility 104. In the exemplary embodiment, data management system user interface 144 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone) that enables the user to input pertinent information.

Data management system 140 may communicate with computing device 106 using a wired network connection (e.g., Ethernet or an optical fiber), a wireless communication means, such as radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, a cellular phone technology (e.g., the Global Standard for Mobile communication (GSM)), a satellite communication link, and/or any other suitable communication means. More specifically, in the exemplary embodiment, data management system 140 transmits the customer data to computing device 106. While the customer data is shown as being stored in database 142 within data management system 140 in the exemplary embodiment, it should be noted that the customer data may be stored in another system and/or device. For example, computing device 106 may store the customer data therein.

During operation, utility 104 may transmit, for example, a questionnaire to its customers via computing device 106. The questionnaire provides questions to each customer to answer regarding the customer and the questionnaire provides various demand response programs that each customer may elect to participate in. More specifically, in the exemplary embodiment, the questionnaire is transmitted to user notification device 110. Each customer may input various responses to the questionnaire via user interface 114 within user notification device 110, including selecting at least one demand response program to participate in and/or selecting at least one demand response program for machine 118 to participate in. Each customer may also specify their location, such as where each customer is geographically located, a location on a network for each customer, and a location of substation 120 for each customer. Alternatively, utility 104 may provide such a questionnaire to its customers via other means. For example, utility 104 may send the questionnaire via mail. Moreover, customers may provide responses for the questionnaire to utility 104 via other means, as opposed to via user notification device 110.

In the exemplary embodiment, if a customer provides his or her responses via user notification device 110, then the information that the customer provides is transmitted to computing device 106 via network 112. Computing device then transmits the information to data management system 140, wherein the data is stored in database 142. If a customer provides his or her responses via other means, utility 104 may receive the information and input the data to data management system 140 via data management system user interface 144, wherein the data may be stored in database 142.

When utility 104 needs to notify its customers regarding a demand response event, such as during a time of the day when a demand response event should be initiated and/or implemented, computing device 106 selectively identifies a plurality of participants of the customers for receiving a plurality of signals that are representative of at least one demand response event. More specifically, a user may input an initiation and/or implementation of a demand response event to computing device 106 or computing device 106 may be programmed to transmit the signals representative of at least one demand response event at a certain time of the day and/or day of the week. Computing device 106 would then receive customer data from database 142 and select a plurality of participants of the customers for receiving the signals representative of at least one demand response event by considering at least the location for each customer, the type of at least one demand response program that the customer has selected to participate in, and or the type of at least one demand response program that customer has selected machine 118 to participate in.

Computing device 106 then incrementally transmits the signals representative of a demand response event such that each selected participant receives at least one of the plurality of signals. For example, thirty percent of the selected participants may receive the signal first, and then another thirty percent of the selected participants may receive the signal fifteen minutes later until all the selected participants have received the signal. Moreover, in the exemplary embodiment, each selected participant receives the signal of a demand response event via user notification device 110. For example, if a selected participant selected to participate in a peak pricing program, such as a critical peak pricing program, pricing signals will be transmitted to the participant during the appropriate peak demand times via user notification device 110.

By selectively identifying participants and by transmitting staggered signals to the participants selected, as opposed to all the customers, utility 104 is able to target specific customers and/or locations on grid 122 to reduce the chances for a failure of grid 122 and there may be a reduction in load leveling. Moreover, by selectively transmitting signals to only selected participants, an overuse of a certain demand response program is prevented and the burden on every customer may be substantially reduced.

Figure 2:
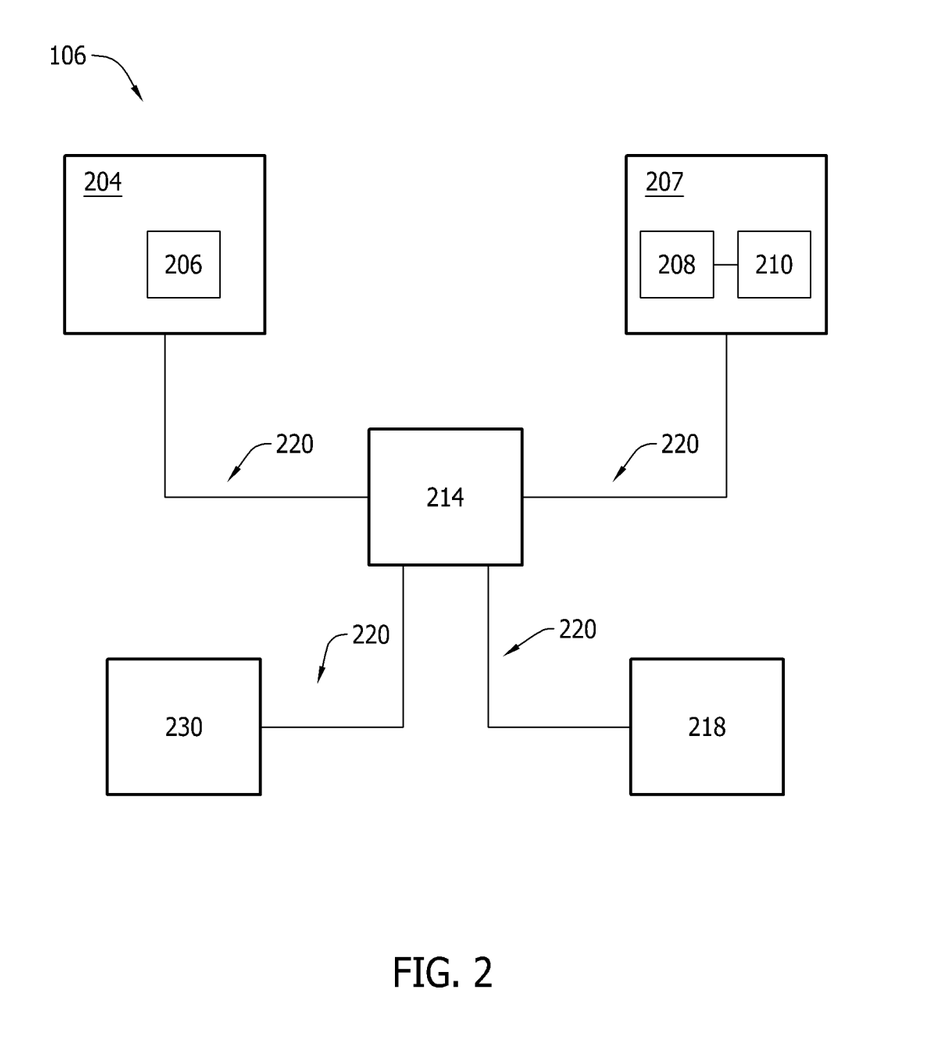
FIG. 2 is a block diagram of an exemplary computing device that may be used with the demand response system shown in FIG. 1.

FIG. 2 is a block diagram of computing device 106. In the exemplary embodiment, computing device 106 includes a user interface 204 that receives at least one input from a user, such as an operator and/or employee of utility 104 (shown in FIG. 1). In the exemplary embodiment, user interface 204 includes a keyboard 206 that enables the user to input pertinent information. Alternatively, user interface 204 may include, for example, a pointing device, a mouse, a stylus, a touch sensitive panel (e.g., a touch pad or a touch screen), a gyroscope, an accelerometer, a position detector, and/or an audio input interface (e.g., including a microphone).

Moreover, in the exemplary embodiment, computing device 106 includes a presentation interface 207 that presents information, such as input events and/or validation results, to the user. In the exemplary embodiment, presentation interface 207 includes a display adapter 208 that is coupled to at least one display device 210. More specifically, in the exemplary embodiment, display device 210 is a visual display device, such as a cathode ray tube (CRT), a liquid crystal display (LCD), an organic LED (OLED) display, and/or an "electronic ink" display. Alternatively, presentation interface 207 may include an audio output device (e.g., an audio adapter and/or a speaker) and/or a printer.

Computing device 106 also includes a processor 214 and a memory device 218. In the exemplary embodiment, processor 214 is coupled to user interface 204, presentation interface 207, and to memory device 218 via a system bus 220. In the exemplary embodiment, processor 214 communicates with the user, such as by prompting the user via presentation interface 207 and/or by receiving user inputs via user interface 204. Moreover, in the exemplary embodiment, processor 214 is programmed by encoding an operation using one or more executable instructions and providing the executable instructions in memory device 218. For example, processor 214 is programmed to select a plurality of participants for receiving signals representative of at least one demand response event. More specifically, in the exemplary embodiment, processor 214 is programmed to select the participants by considering at least the location for each customer, the type of at least one demand response program that the customer has selected to participate in, and/or the type of at least one demand response program that the customer has selected machine 118 (shown in FIG. 1) to participate in.

Processor 214, in the exemplary embodiment, is further programmed to incrementally transmit a plurality of signals representative of the demand response event to each selected participant, wherein each participant receives at least one signal. More specifically, in the exemplary embodiment, processor 214 is programmed to organize the selected participants in a hierarchy and processor 214 is programmed to incrementally transmit the signals based on the hierarchy. For example, processor 214 may be programmed to organize the hierarchy based on the demand response event type. Processor 214 may organize at least one participant who resides in a particular geographic location and is enrolled in a critical peak pricing program in a first tier of the hierarchy and organize at least one participant who resides in a different geographic location and is enrolled in a different type of demand response program in a last tier of the hierarchy.

The term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, memory device 218 includes one or more devices that enable information, such as executable instructions and/or other data, to be stored and retrieved. Moreover, in the exemplary embodiment, memory device 218 includes one or more computer readable media, such as, without limitation, dynamic random access memory (DRAM), static random access memory (SRAM), a solid state disk, and/or a hard disk. In the exemplary embodiment, memory device 218 stores, without limitation, application source code, application object code, configuration data, additional input events, application states, assertion statements, validation results, and/or any other type of data. More specifically, in the exemplary embodiment, memory device 218 stores input data received by a user via user interface 204, and/or information received from other components of demand response system 100 (shown in FIG. 1), such as from user notification device 110 (shown in FIG. 1) and/or data management system 140 (shown in FIG. 1).

Computing device 106, in the exemplary embodiment, also includes a communication interface 230 that is coupled to processor 214 via system bus 220. Moreover, in the exemplary embodiment, communication interface 230 is communicatively coupled to user notification device 110 and data management system 140 via network 112 (shown in FIG. 1). In the exemplary embodiment, communication interface 230 communicates with user notification device 110, data management system 140, and/or other components within system 100.

During operation, utility 104 may transmit, for example, a questionnaire to its customers via computing device 106. The questionnaire provides questions to each customer to answer regarding the customer and the questionnaire provides various demand response programs that each customer may elect to participate in. More specifically, in the exemplary embodiment, the questionnaire is transmitted to user notification device 110. Each customer may input various responses to the questionnaire via user interface 114 (shown in FIG. 1) within user notification device 110, including selecting at least one demand response program to participate in and/or selecting at least one demand response program to have machine 118 participate in. Each customer may also specify their location, such as where each customer is geographically located, a location on a network for each customer, and a location for substation 120 for each customer. Alternatively, utility 104 may provide such a questionnaire to its customers via other means. For example, utility 104 may send the questionnaire via mail. Moreover, customers may provide responses for the questionnaire to utility 104 via other means, as opposed to via user notification device 110.

In the exemplary embodiment, if a customer provides his or her responses via user notification device 110, then the information that customer provides is transmitted to computing device 106 via network 112. Computing device then transmits the information to data management system 140, wherein the data is stored in database 142 (shown in FIG. 1). If a customer provides his or her responses via other means, utility 104 may receive the information and input the data to data management system 140 via user interface 144 (shown in FIG. 1), wherein the data may be stored in database 142.

When utility 104 needs to notify its customers regarding the initiation and/or the implementation of a demand response event, computing device 106 selectively identifies a plurality of participants of the customers to receive at least one signal representative of at least one demand response event. A user may input an initiation and/or implementation of a demand response event in computing device 106 via user interface 204 or, alternative, processor 214 may be programmed to transmit the signals representative of at least one demand response event at a certain time of the day and/or day of the week. Processor 214 transmits a signal via communication interface 230 to data management system 140 to retrieve customer data from database 142. Customer data is transmitted from database 142 to computing device 106, wherein communication interface 230 receives the data and transmits the data to processor 214.

Processor 214 selects and identifies a plurality of participants of the customers for receiving at least one signal representative of at least one demand response event. More specifically, in the exemplary embodiment, processor 214 selects the participants by considering at least the location for each customer, the type of demand response program that customer has selected to participate in, and/or the type of demand response program that customer has selected machine 118 to participate in. When processor 214 has selected the participants, processor 214 then incrementally transmits a plurality of signals representative of at least one demand response event to the participants such that each participant receives at least one signal. More specifically, in the exemplary embodiment, processor 214 organizes the selected participants in a hierarchy and processor 214 incrementally transmits each signal based on the hierarchy. For example, processor 214 may organize the hierarchy based on the demand response event type. Processor may also organize at least one participant who resides in a particular geographic location and who is enrolled in a critical peak pricing program in a first tier of the hierarchy and organize at least one participant who resides in a different geographic location and who is enrolled in a different type of demand response program in a last tier of the hierarchy. Another plausible example may be for processor 214 to organize at least one participant who receives power from a utility asset location, such as substation 120 (shown in FIG. 1) and is enrolled in a direct load control program in a first tier of the hierarchy and organize at least one participant who receives power from a different substation (not shown) and who is enrolled in a different type of demand response program in a last tier of the hierarchy.

Accordingly, in the exemplary embodiment, selected participants who reside in one geographic area and are in enrolled in a certain demand response program may receive the signal before selected participants who live in another geographic location and who are enrolled in a different demand response program. Moreover, selected participants who receive power from the utility asset, such as substation 120 and are enrolled in a direct load control program may receive the signal before selected participants who receive power from a different substation and who are enrolled in a different type of demand response program. For example, thirty percent of the selected participants may receive the signal first, and then another thirty percent of the selected participants may receive the signal fifteen minutes later until all the participants have received the signal.

Moreover, in the exemplary embodiment, each selected participant receives the signal of the demand response event via user notification device 110. For example, if a selected participant elected to participate in a critical peak pricing program, pricing signals will be transmitted to the participant during the appropriate peak demand times via user notification device 110.

Figure 3:
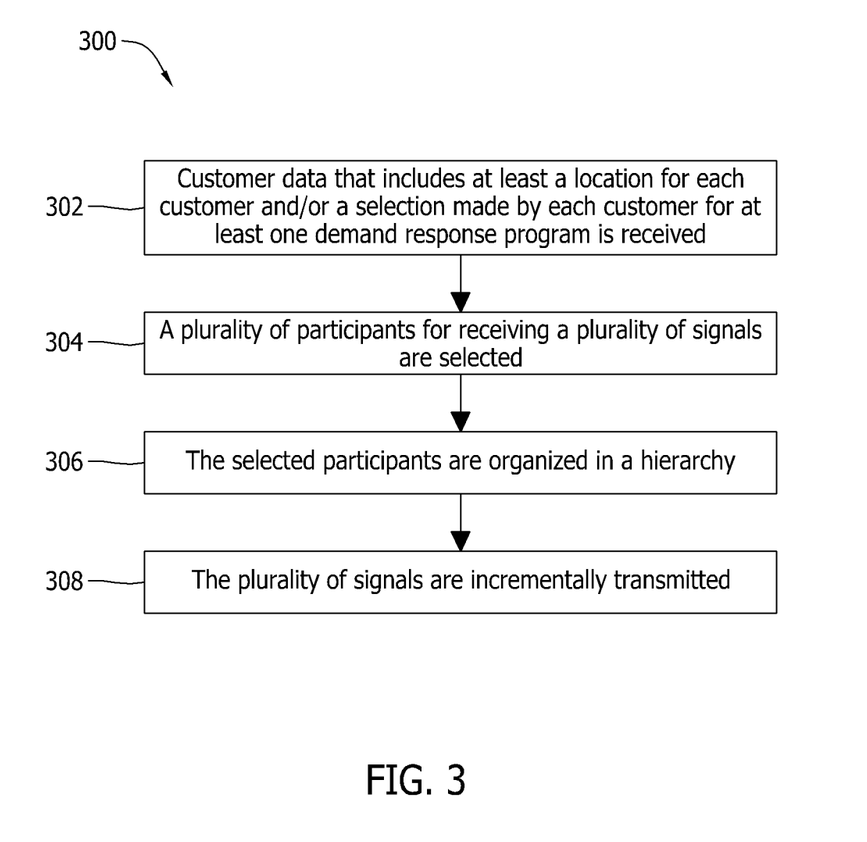
FIG. 3 is a flow chart of an exemplary method that may be used for implementing demand response events using the computing device shown in FIG. 2.

FIG. 3 is a flow chart of a method 300 that may be used for implementing demand response events using a computing device, such as computing device 106 (shown in FIGS. 1 and 2). Customer data that includes at least a location for each customer and/or a selection made by each customer for at least one demand response program is received 302 by a communication interface 230 (shown in FIG. 2) from a database 142 (shown in FIG. 1). A plurality of participants for receiving a plurality of signals that are representative at least one demand response event are selected 304, via a processor 214 (shown in FIG. 2), by considering at least the location for each customer, the type of demand response program that each customer has selected to participate in, and/or the type of demand response program that each customer has selected at least one machine 118 (shown in FIG. 1) to participate in. The selected participants are organized 306 in a hierarchy, via processor 214. The plurality of signals are then incrementally transmitted 308 to the selected participants based on the hierarchy such that each participant receives at least one signal.

As compared to known demand response systems that are used to enable utilities to manage energy consumption by the implementation of demand response events, the exemplary systems and methods described herein enable a utility to selectively transmit signals representative of demand response events to its customers. More specifically, the embodiments described herein provide a computing device for use with a demand response system. The computing device includes an interface for receiving customer data that includes at least a location for each customer and/or a preference selection made by each customer associated with at least one demand response program. A processor coupled to the interface and programmed to select a plurality of participants from the customer data to receive a plurality of signals representative of at least one demand response event. The processor selects the participants based at least in part on the customer location and/or the preference selection associated with each customer. Accordingly, the utility is able to target specific customers and/or locations on their grid to provide more reliable and substantially greater load reduction. Moreover, by selectively transmitting signals to only selected participants, an overuse of a certain demand response program is prevented and the burden on every customer may be substantially reduced.

A technical effect of the systems and methods described herein includes at least one of: (a) receiving customer data that includes at least one of a location for each customer and a preference selection made by each customer associated with at least one demand response program; and (b) selecting a plurality of participants from the customer data to receive a plurality of signals that are representative of at least one demand response event based at least in part on at least one of a location for each customer and a preference selection made by each customer associated with at least one demand response program.

Exemplary embodiments of the systems and methods are described above in detail. The systems and methods are not limited to the specific embodiments described herein, but rather, components of the systems and/or steps of the methods may be utilized independently and separately from other components and/or steps described herein. For example, the systems may also be used in combination with other systems and methods, and is not limited to practice with only the systems as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for use with a demand response system, said computing device comprising:
   an interface for receiving consumer data from an associated consumer including at least one of a geographic location for each consumer and a preference selection made by each consumer associated with at least one demand response program; and
   a processor coupled to said interface and programmed to, for each of a plurality of demand response events, select a plurality of participants from the consumer data to receive a plurality of signals representative of a current demand response event of the plurality of demand response events, said processor:
   (i) organizes the plurality of participants into a hierarchy based on the current demand response event, at least in part on at least one of the consumer geographic location and the preference selection associated with each consumer, and a type of the at least one demand response program being at least one of a direct load control program, a peak pricing program, a rebate-based program, and a time of use program; and (ii) incrementally transmits each of the plurality of signals based on the hierarchy.

2. A computing device in accordance with claim 1, wherein said processor is further programmed to incrementally transmit the plurality of signals to the plurality of selected participants such that each participant receives at least one signal of the plurality of signals.

3. A computing device in accordance with claim 1, wherein said processor selects the plurality of participants based at least in part on the preference selection for at least one of a direct load control program, a peak pricing program, a rebate-based program, and a time of use program.

4. A computing device in accordance with claim 1, wherein said processor selects the plurality of participants based at least in part on the preference selection made by each consumer associated with the at least one demand response program to implement for at least one machine within a building.

5. A computing device in accordance with claim 1, wherein said processor selects the plurality of participants based at least in part on a geographic location, a location on a network for each consumer, and a utility asset location associated with each consumer.

6. A demand response system comprising:
a computing device comprising:
an interface for receiving consumer data from an associated consumer including at least one of a geographic location for each consumer and a preference selection made by each consumer associated with at least one demand response program; and
a processor coupled to said interface and programmed to, for each of a plurality of demand response events, select a plurality of participants from the consumer data to receive a plurality of signals representative of a current demand response event of the plurality of demand response events, said processor (i) organizes the plurality of participants into a hierarchy based on the current demand response event, at least in part on at least one of the consumer geographic location and the preference selection associated with each consumer, and a type of the at least one demand response program being at least one of a direct load control program, a peak pricing program, a rebate-based program, and a time of use program, and (ii) incrementally transmits each of the plurality of signals based on the hierarchy; and
at least one user notification device coupled to said computing device to enable each participant to receive at least one signal of the plurality of signals.

7. A demand response system in accordance with claim 6, wherein said at least one user notification device is at least one of a phone, a computer system, and a smart device.

8. A demand response system in accordance with claim 6, further comprising a data management system coupled to said computing device for transmitting the consumer data to said computing device and for storing the consumer data.

9. A demand response system in accordance with claim 6, wherein said processor is further programmed to incrementally transmit the plurality of signals to the plurality of selected participants such that each participant receives at least one signal of the plurality of signals.

10. A demand response system in accordance with claim 6, wherein said processor selects the plurality of participants based at least in part on the preference selection for at least one of a direct load control program, a peak pricing program, a rebate-based program, and a time of use program.

11. A demand response system in accordance with claim 6, wherein said processor selects the plurality of participants based at least in part on the preference selection made by each consumer associated with the at least one demand response program to implement for at least one machine within a building.

12. A demand response system in accordance with claim 6, wherein said processor selects the plurality of participants based at least in part on a geographic location, a location on a network for each consumer, and a utility asset location associated with each consumer.

13. A method for implementing demand response events, said method comprising:
receiving, by a processor coupled to a memory, consumer data from an associated consumer that includes at least one of a geographic location for each consumer and a preference selection made by each consumer associated with at least one demand response program;
for each of a plurality of demand response events, selecting, by a processor coupled to a memory, a plurality of participants from the consumer data to receive a plurality of signals that are representative of a current demand response event of the plurality of demand response events; and
organizing the plurality of participants into a hierarchy based on the current demand response event, at least in part on at least one of the consumer geographic location and the preference selection associated with each consumer, and a type of the at least one demand response program being at least one of a direct load control program, a peak pricing program, a rebate-based program, and a time of use program.

14. A method in accordance with claim 13, further comprising transmitting incrementally the plurality of signals to the plurality of selected participants such that each participant receives at least one signal of the plurality of signals.

15. A method in accordance with claim 13, further comprising transmitting, incrementally, the plurality of signals to the plurality of selected participants based on the hierarchy.

16. A method in accordance with claim 13, wherein receiving consumer data further includes receiving consumer data that includes at least one of a location for each consumer and a preference selection made by each consumer for at least one of a direct load control program, a peak pricing program, a rebate-based program, and a time of use program.

17. A computing device in accordance with claim 13, wherein receiving consumer data further comprises receiving consumer data that includes at least one of a geographic location for each consumer, a location on a network for each consumer, and a utility asset location for each consumer.

* * * * *

UNITED STATES PATENT AND TRADEMARK OFFICE
CERTIFICATE OF CORRECTION

PATENT NO.         : 9,125,010 B2
APPLICATION NO.    : 13/283299
DATED              : September 1, 2015
INVENTOR(S)        : Meyerhofer et al.

Page 1 of 1

It is certified that error appears in the above-identified patent and that said Letters Patent is hereby corrected as shown below:

In the Specification
    Column 6, line 13, delete "and or" and insert therefor -- and/or --.

In the Claims
    In Claim 17, column 12, line 56, delete "A computing device in accordance with" and insert therefor -- A method in accordance with --.

Signed and Sealed this
Twenty-second Day of March, 2016

Michelle K. Lee
*Director of the United States Patent and Trademark Office*